United States Patent [19]

Kayali

[11] Patent Number: 5,014,956
[45] Date of Patent: * May 14, 1991

[54] ADJUSTABLE DRINK HOLDER

[75] Inventor: Nabil A. Kayali, Houston, Tex.

[73] Assignee: NK Innovations, Inc., Houston, Tex.

[*] Notice: The portion of the term of this patent subsequent to Dec. 19, 2006 has been disclaimed.

[21] Appl. No.: 414,136

[22] Filed: Sep. 27, 1989

Related U.S. Application Data

[62] Division of Ser. No. 317,964, Mar. 2, 1989, Pat. No. 4,887,784.

[51] Int. Cl.$^5$ .............................................. A47K 1/09
[52] U.S. Cl. ................................................ 248/311.2
[58] Field of Search .................. 248/311.2, 278, 103, 248/207, 214, 231.5, 309.1, 310, 314, 315; 215/12.1, 100 R; 220/85 H; 206/446

[56] References Cited

U.S. PATENT DOCUMENTS

| | | |
|---|---|---|
| D. 202,607 | 10/1965 | McLarty . |
| D. 212,111 | 8/1968 | Zaretsky . |
| D. 279,836 | 7/1985 | Tanaka . |
| D. 289,961 | 5/1987 | Hentrich . |
| 815,654 | 3/1906 | Strobel ............................... 248/313 |
| 866,463 | 9/1907 | Hart . |
| 1,295,120 | 2/1919 | Cartre ................................. 248/313 |
| 1,315,621 | 9/1919 | Barlow . |
| 2,649,270 | 8/1953 | Franks . |
| 2,893,675 | 7/1959 | Smith . |
| 2,926,879 | 3/1960 | Dietrich . |
| 3,045,962 | 7/1962 | Paulus . |
| 3,051,428 | 8/1962 | Schult . |
| 3,184,201 | 5/1965 | Smith . |
| 3,233,858 | 2/1966 | Benjamin . |
| 3,734,439 | 5/1973 | Wintz . |
| 3,840,204 | 10/1974 | Thomas . |
| 4,071,976 | 2/1978 | Chernewski ........................ 248/313 |
| 4,093,165 | 6/1978 | Sussman ........................... 248/205.5 |
| 4,1313,259 | 12/1978 | Franks . |
| 4,191,350 | 3/1980 | Ormond . |
| 4,324,381 | 4/1982 | Morris . |
| 4,434,961 | 3/1984 | Hoye . |
| 4,535,923 | 8/1985 | Manke . |
| 4,721,276 | 1/1988 | Moss . |
| 4,727,462 | 2/1988 | Komonko ......................... 248/206.5 |
| 4,828,211 | 5/1989 | McConnell . |

FOREIGN PATENT DOCUMENTS 388137  2/1933  United Kingdom ................ 248/314

Primary Examiner—Ramon O. Ramirez
Assistant Examiner—Robert A. Olson
Attorney, Agent, or Firm—Pravel, Gambrell, Hewitt, Kimball & Krieger

[57] ABSTRACT

An adjustable drink holder having a frame and a pivotable drink base along with a pivotable and height-adjustable retaining hoop. The base and hoop can be folded compactly for storage in the frame.

12 Claims, 3 Drawing Sheets

ADJUSTABLE DRINK HOLDER

This is a Divisional Application based upon U.S. Pat. application Ser. No. 317,964 filed Mar. 2, 1989 and now issued as U.S. Pat. No. 4,887,784.

FIELD OF THE INVENTION

This invention is in the field of devices used to hold a drinking glass or cup without spilling, by attachment to any available structure, such as a chair or an automobile dashboard.

BACKGROUND

Many human activities are conducted in environments where the presence of a table for refreshment purposes is not feasible. Probably foremost among these environments is the automobile, where an average person often spends appreciable amounts of time. Other such environments are workshops and crowded computer work stations. Because a person often spends considerable time in these places, he usually wants to consume liquid refreshment while he is occupied with his driving or working. The average automobile has little or no flat space in which to set a beverage container such as a glass, can or cup. Similarly, even though a workbench or a computer work station may have flat surfaces, they are usually crowded, and spilled beverages can create a major problem.

It is desirable, then, to have a device which could hold a beverage container in an environment such as these. Many devices have been contrived to serve this need. Most often, they incorporate a gimbaled mount of some kind with a holder suspended from a single point. Sometimes these devices can mount directly to an environmental surface, and sometimes they require that a permanent mounting fixture be mounted on the surface prior to hanging the drink holder from the fixture. This latter method has the obvious disadvantage that the beverage holder cannot be moved from one place to another without first installing a new mounting fixture.

The devices which can be mounted directly to an environmental surface are usually somewhat limited to surfaces having a given orientation. This is because they can only be adjusted about one, two or three axes of rotation. Depending upon the surface to which the drink holder is attached, this limited scheme of adjustment may leave the drink holder too high or low, tilted at an angle or out of position horizontally. When the available surfaces are severely limited, such as in an automobile, the inability to properly adjust the drink holder may make it useless.

Another disadvantage suffered by most known drink holders is that they are awkward and relatively bulky, consuming valuable space even when not in use. It would be helpful to be able to fold up a drink holder into a minimum amount of space when it is not in use. This can also be helpful in packaging the device for sale.

SUMMARY OF THE INVENTION

This invention is a stable drink holder which can be adjusted about four axes of rotation to facilitate mounting of the holder on almost any surface while making possible the positioning of the beverage container in a useful orientation. This drink holder also will fold up into a small package for storage, consuming the minimum amount of space necessary. The holder is also adjustable to different heights of beverage containers, and it can be used with large mugs as well as beverage cans or glasses.

The holder attaches to an available surface by means of a large spring clamp which can have suction cups. Extending from this attachment device is a linkage of longitudinal elements having four axes of rotational adjustment, with the longitudinal elements being connected end-to-end. The axes of rotation are located at the end-points of the longitudinal elements. They can be bolts and wing nuts or ball-detent mechanisms, or a combination of both.

Connected to the linkage on the end opposite the clamp is a frame to which are attached pivotable base and a pivotable hoop. The base and hoop are pivoted perpendicular to the frame, so that a container can be set upon the base and encircled by the hoop. When not in use, the base and hoop can be pivoted parallel to the frame, and the linkage can be folded frame.

DETAILED DESCRIPTION OF THE PREFERRED EMBODIMENT

Figure 1:
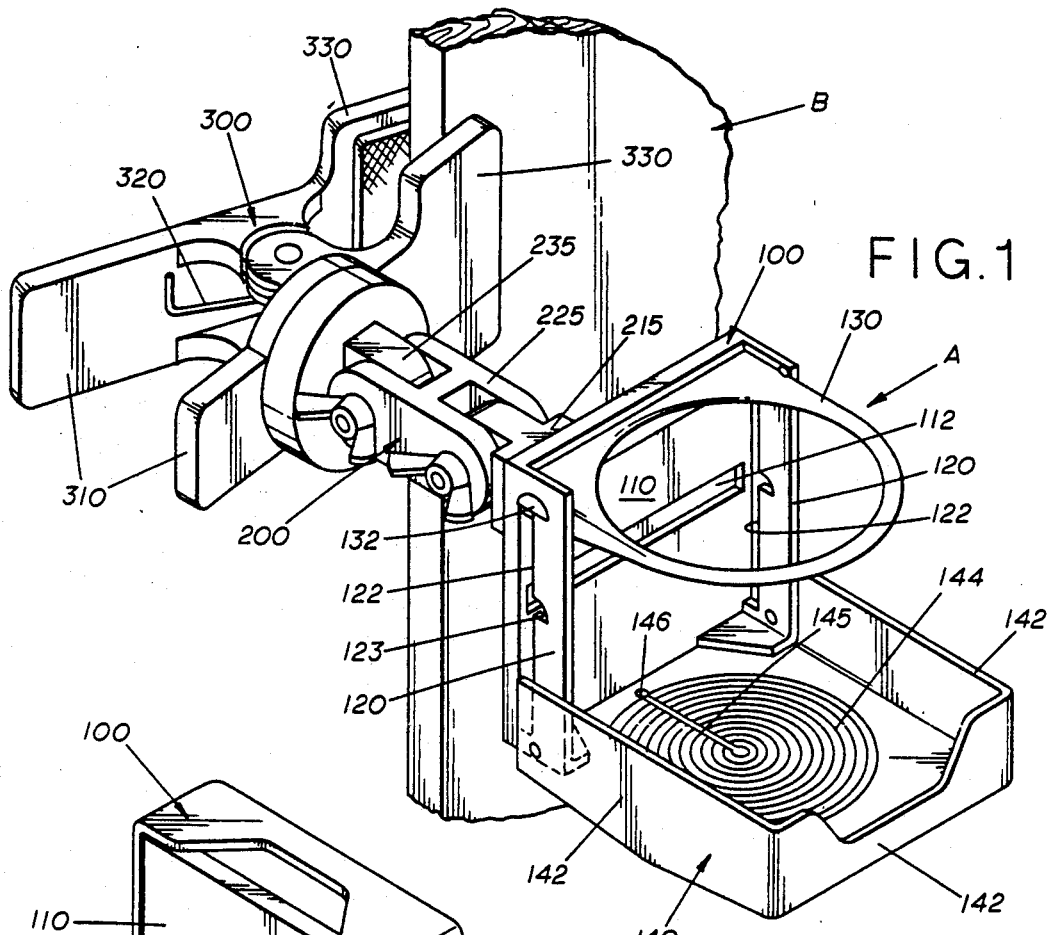
FIG. 1 is a perspective view of the apparatus of the present invention attached to a vertical surface.

As seen in FIG. 1, the adjustable drink holder A is clamped to a vertical surface B for support. The surface to which it is clamped need not be vertical or even flat. It can be at virtually any angle, and it can have any shape as long as it is small enough to fit in the clamp 300.

Figure 2:
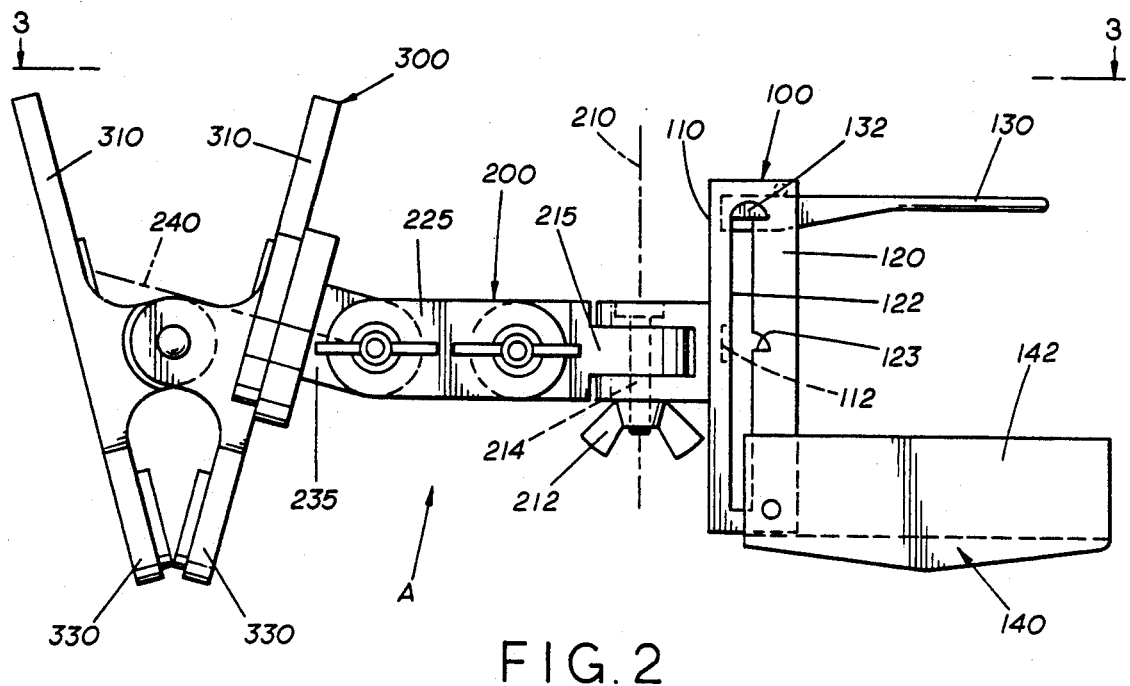
FIG. 2 an elevational side view of the apparatus of FIG. 1 shown fully extended.
Figure 3:
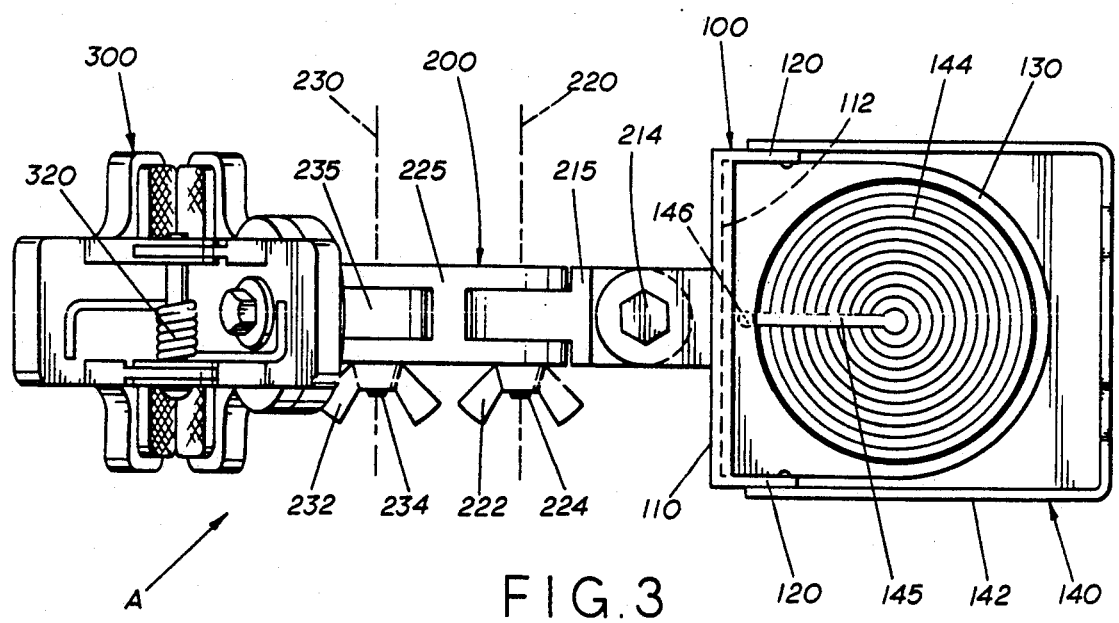
FIG. 3 is a plan view of the apparatus of FIG. 2.

As shown in FIG. 2 and 3, frame 100 has a bulkhead 110 generally held vertical when the holder is in use. Connected along the edges of bulkhead 110 are sidewalls 120, also vertical, in which are formed channels 122 and channel cutouts 123, which are approximately twice as wide as channels 122.

Attached to sidewalls 120 is hoop 130, by means of hoop pivot pins 132. Pivot pins 132 are semicircular in cross section with a major diameter approximately equal to the width of channel cutouts 123, and with a minor diameter approximately equal to the width of channel 122.

Spaced along bulkhead 110 are horizontal grooves 112 into which an edge of hoop 130 can insert when hoop 130 is pivoted to its horizontal position. Grooves 112 could easily be replaced by properly placed ridges or friction bumps (not shown).

Base 140 is a rectangular platform pivotably attached to the lower ends of sidewalls 120. Base 140 has raised rim 142 around three sides, and it is pivoted along its forth side. Base 140 also has a series of concentric raised ridges 144 on its upper surface to facilitate the collection of liquid, such as condensate running off a cold can. Cut through ridges 144 is a draining groove 145 leading to a drain hole 146.

Pivot linkage 200 is attached to bulkhead 110 on the side opposite from hoop 130 and base 140. Linkage 200 consists of four pivot points 210, 220, 230, 240 at the connections between three link elements 215, 225 and 235, including both free ends. Pivot points 210, 220 and 230 are shown as bolts having wing nuts, and pivot point 240 is shown as a ball-detent mechanism. This mechanism has a series of spring loaded balls seated in shallow detents (not shown) to hold a desired angular position. Either type could be used at any pivot point. Pivot point 210 is mounted directly on bulkhead 110, while pivot point 240 is mounted directly on spring clamp 300. Spring clamp 300 is well known in the art, having handles 310 which can be squeezed together against the pressure of spring 320 to cause jaws 330 to open.

Pivot point 210 has an axis of rotation that is parallel to the vertical axis of the bulkhead 110. Pivot point 240 has an axis of rotation that will remain coplanar with the axis of pivot 210. These two axes could be parallel or they could intersect at any angle. This means that the vertical axis of the frame 100 can be aligned vertical relative to the ground regardless of the angle of inclination of the surface to which the apparatus is attached.

Pivot points 220 and 230 have axes of rotation that are always parallel to each other, and they define a plane that is always perpendicular to the plane defined by the axes of pivot points 210 and 240. This means that rotation of pivot points 220 and 230 results in translational, rather than purely angular movement of frame 100. Link element 225 can have various lengths according to the magnitude of translational movement that is required. This facilitates the raising of frame 100 high above a low attachment surface or suspending frame 100 well below a high attachment surface. It also facilitates the location of frame 100 either close to or well away from the attachment surface, as desired.

Of course, pivot point 210 is manipulated to cause frame 100 and base 140 to face the desired direction. Pivot point 240 is manipulated as required to bring frame 100 to vertical, regardless of the angle at which clamp 300 is attached to the available surface.

In order to use the adjustable drink holder, a suitable clamping surface is first selected. The only requirements are that the surface fit within the clamp and provide sufficient support for the device and beverage container. Clamp 300 is clamped securely onto the selected surface. Then, pivot point 240 is rotated until the axis of pivot point 230 is horizontal. This ensures that the base 140 can be horizontal after all adjustments are made. The ball-detent mechanism of pivot point 240 will hold its position without any tightening.

Wing nut 232 on bolt 234 is then loosened, and pivot point 230 is adjusted to achieve the desired height and distance of the frame 100 from clamp 300. Wing nut 232 is then tightened. Next, wing nut 222 on bolt 224 is loosened, and pivot point 220 is adjusted to bring base 140 to horizontal. Wing nut 222 is then tightened. Finally, wing nut 212 on bolt 214 is loosened, and pivot point 210 is adjusted to cause frame 100 and base 140 to face the proper direction. Then, wing nut 212 is tightened. Loosening and tightening of wing nuts may not be necessary, depending upon the materials of construction and the weight of the beverage container.

After this adjustment, the height of hoop 130 is set as desired to match the beverage container by pivoting hoop 130 until it is parallel to bulkhead 110 and then sliding hoop 130 up or down in channels 120. When the desired height of hoop 130 is reached, it is pivoted down until it is perpendicular to bulkhead 110, locking hoop 130 in place in desired groove 112. Base 140 is pivoted perpendicular to bulkhead 110.

Figure 4:
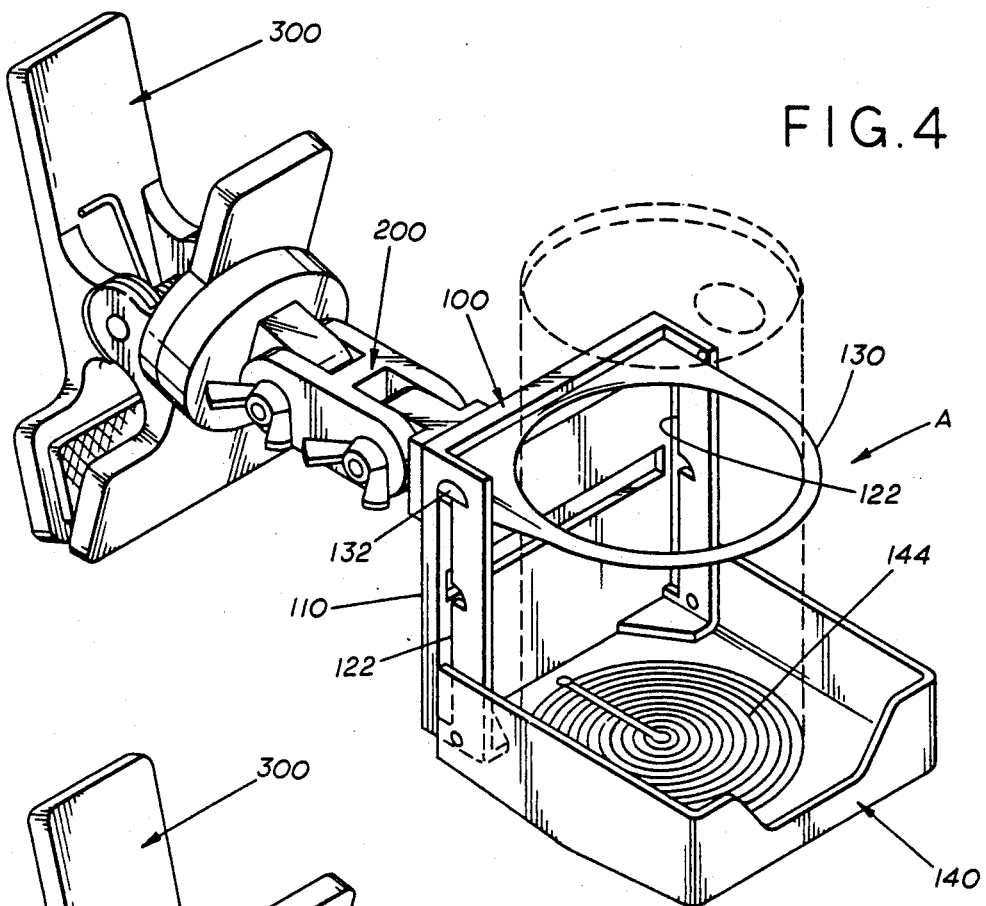
FIG. 4 is a perspective view of the frame, hoop and base of the apparatus of FIG. 2, configured to hold a can.
Figure 5:
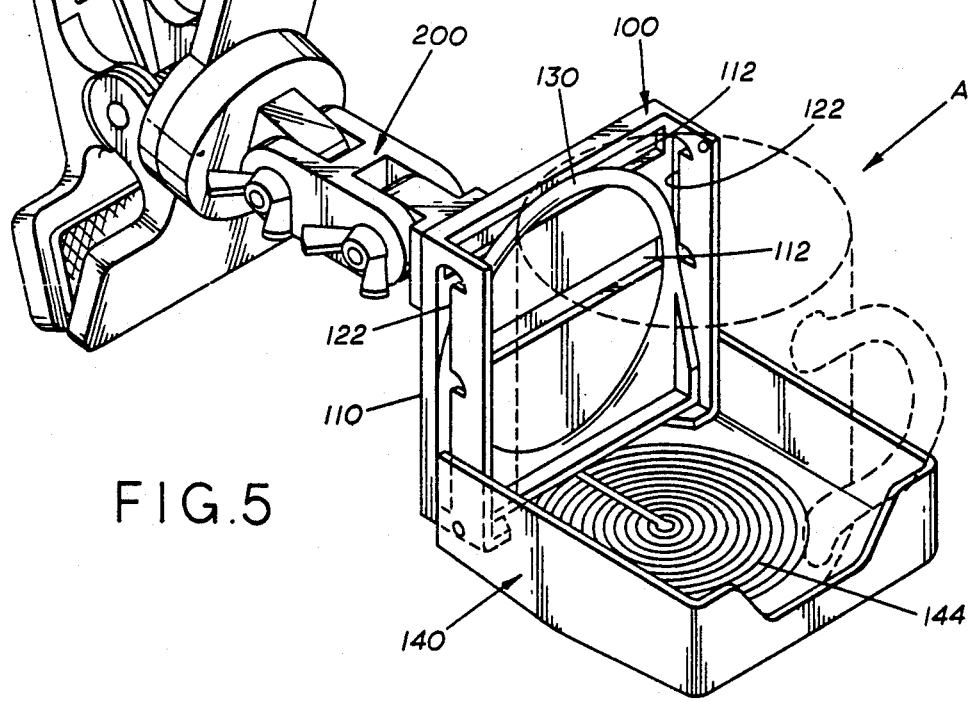
FIG. 5 is a perspective view of the apparatus of FIG. 4 to hold a mug.

FIG. 4 shows hoop 130 in place for use with a beverage can, while FIG. 5 shows hoop 130 stored against bulkhead 110 for use with a large mug.

Figure 6:
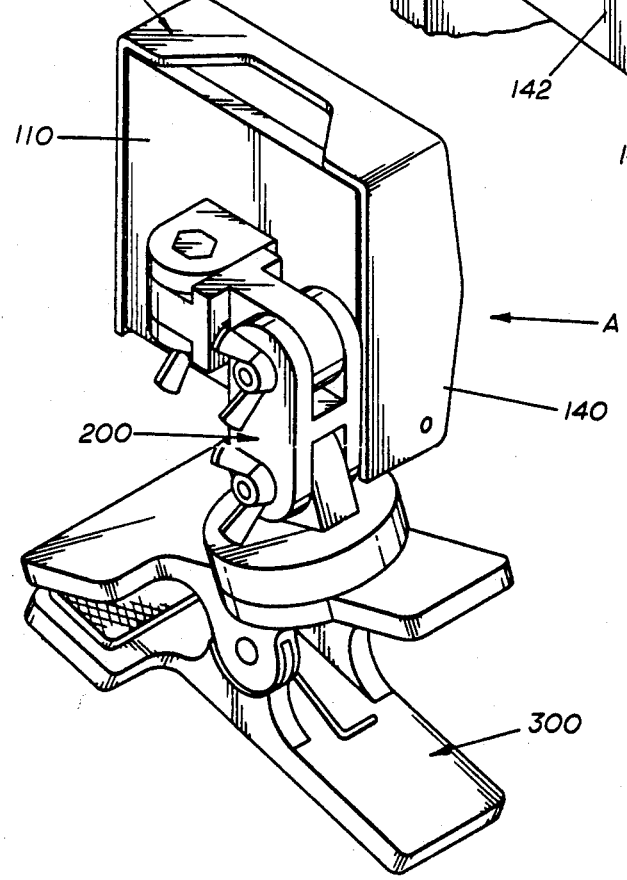
FIG. 6 a perspective view of the apparatus of FIG. 1 folded in a storage position.

When the drink holder is not in use, it can be left clamped in place. Hoop 130 is pivoted parallel to bulkhead 110 and slid all the way down in channels 120. Base 140 is pivoted parallel to bulkhead 110, covering hoop 130. If desired, the clamp 300 can be released, and the linkage arrangement 200 can be folded compactly against the side of the bulkhead 110 opposite base 140, as shown in FIG. 6.

The description given here refers to a preferred embodiment and is illustrative only. It will be obvious to one skilled in the art that variations on this embodiment are possible without departing from the invention. Such variations are intended to be encompassed by the following claims.

I claim:

1. An apparatus for holding a beverage container, comprising:
    a frame;
    a base pivotably connected to the frame near a lower end of the frame to pivot between a closed position parallel to the frame and an opened position perpendicular to the frame; and
    a hoop pivotably connected to the frame above the base to pivot between a closed position parallel to the frame and an opened position perpendicular to the frame wherein the pivot point of at least one of the opened hoop and the opened base is adjustable along the vertical axis of the frame.

2. The apparatus of claim 1, wherein the pivot point of the hoop is adjustable by means of a first channel along a side of the frame with cutouts spaced longitudinally along the channel and having greater width than the channel width such that the hoop can slide along the channel in the closed position and pivot to the opened position at a cutout.

3. The apparatus of claim 2, wherein the frame further comprises:
    a substantially flat vertical bulkhead;
    a second channel means in which the hoop can pivot; and
    first and second sidewalls connected to the bulkhead along two vertical sides of the frame, in which the first and second channel means, respectively, are located.

4. The apparatus of claim 2, wherein the hoop includes a pivot rod, semicircular in cross-section, having a major diameter substantially equal to the width of a channel cutout, and having a minor diameter substantially equal to the width of the channel, the pivot rod being inserted in the channel.

5. The apparatus of claim 1, wherein the frame includes a friction means for holding the hoop in its position perpendicular to the frame.

6. The apparatus of claim 1, wherein the base includes:
    a plurality of raised ridges on an upper surface to collect liquid.

7. The apparatus of claim 6 wherein the base further includes:
    a drain hole; and
    a drain channel through the ridges to direct collected liquid the drain hole.

8. The apparatus of claim 1, wherein the hoop can pivot to a storage position parallel to and within the frame and the base can pivot to a storage position parallel to and outside the frame.

9. The apparatus of claim 1, further comprising attachment means mounted on the frame for attaching the apparatus to a selected structure.

10. The apparatus of claim 9, wherein the attachment means comprises a suction cup.

11. The apparatus of claim 9, wherein the attachment means comprises a spring biased clamp.

12. The apparatus of claim 9, wherein the attachment means comprises a magnet.

* * * * *